(12) United States Patent
Brandt

(10) Patent No.: US 9,052,845 B2
(45) Date of Patent: Jun. 9, 2015

(54) UNIFIED INTERFACE FOR META MODEL CHECKING, MODIFYING, AND REPORTING

(75) Inventor: Carsten Brandt, Mannheim (DE)

(73) Assignee: SAP SE, Walldorf (DE)

( * ) Notice: Subject to any disclaimer, the term of this patent is extended or adjusted under 35 U.S.C. 154(b) by 943 days.

(21) Appl. No.: 13/017,748

(22) Filed: Jan. 31, 2011

(65) Prior Publication Data

US 2012/0198415 A1    Aug. 2, 2012

(51) Int. Cl.
    G06F 9/44    (2006.01)
    G06F 7/00    (2006.01)
    G06F 9/45    (2006.01)

(52) U.S. Cl.
    CPC .. G06F 8/10 (2013.01); G06F 8/43 (2013.01); G06F 8/73 (2013.01)

(58) Field of Classification Search
    None
    See application file for complete search history.

(56) References Cited

U.S. PATENT DOCUMENTS

| | | | |
|---|---|---|---|
| 5,677,997 A * | 10/1997 | Talatik | 706/45 |
| 5,850,535 A * | 12/1998 | Maystrovsky et al. | 703/2 |
| 5,990,887 A | 11/1999 | Redpath et al. | |
| 6,430,599 B1 * | 8/2002 | Baker et al. | 709/203 |
| 6,983,227 B1 * | 1/2006 | Thalhammer-Reyero | 703/2 |
| 7,296,017 B2 | 11/2007 | Larcheveque et al. | |
| 7,398,469 B2 | 7/2008 | Kisamore et al. | |
| 7,424,410 B2 * | 9/2008 | Orofino et al. | 703/2 |
| 7,584,457 B2 | 9/2009 | Hammerich et al. | |
| 7,792,934 B2 | 9/2010 | Klein | |
| 7,853,678 B2 | 12/2010 | Khemani et al. | |
| 7,853,679 B2 | 12/2010 | Khemani et al. | |
| 7,865,589 B2 | 1/2011 | Khemani et al. | |
| 7,870,277 B2 | 1/2011 | Korrapati et al. | |
| 7,925,694 B2 | 4/2011 | Harris | |
| 8,090,877 B2 | 1/2012 | Agarwal et al. | |
| 8,127,237 B2 | 2/2012 | Beringer | |
| 8,131,668 B2 | 3/2012 | Beringer et al. | |
| 8,181,155 B2 | 5/2012 | Pinto et al. | |

(Continued)

FOREIGN PATENT DOCUMENTS

EP    2065799    6/2009

OTHER PUBLICATIONS

Il-Kyu Ha; Byung-Wook Kang, "Meta-validation of UML structural diagrams and behavioral diagrams with consistency rules," Communications, Computers and signal Processing, 2003. PACRIM. 2003 IEEE Pacific Rim Conference on , vol. 2, No., pp. 679,683 vol. 2, Aug. 28-30, 2003.*

(Continued)

Primary Examiner — James D Rutten
(74) Attorney, Agent, or Firm — Fish & Richardson P.C.

(57) ABSTRACT

This disclosure provides various embodiments for performing operations on entities of a meta model modeling one or more software components. A request is received to perform a particular operation of a particular type on each of a plurality of model entities, each model entity modeling at least one attribute of a software component. The request includes an identification of the particular type of operation in a plurality of operation types. The model entities are retrieved in response to the request. A handler object is instantiated of the particular type adapted to perform the particular operation by calling a set of reusable software modules, each software module providing functionality used to perform at least a portion of the particular operation on at least one entity in the plurality of entities. Result data is generated based on the performance of the particular operation using the instantiated handler and reusable software modules.

26 Claims, 13 Drawing Sheets

(56) References Cited

U.S. PATENT DOCUMENTS

| | | | |
|---|---|---|---|
| 8,184,070 | B1 | 5/2012 | Taubman |
| 8,191,042 | B2 | 5/2012 | Pinto et al. |
| 8,234,332 | B2 | 7/2012 | Jaudon et al. |
| 8,239,239 | B1 | 8/2012 | Malhotra et al. |
| 8,250,169 | B2 | 8/2012 | Beringer et al. |
| 8,276,193 | B2 | 9/2012 | Cox et al. |
| 8,341,287 | B2 | 12/2012 | Khemani et al. |
| 8,458,662 | B2 | 6/2013 | Grechanik et al. |
| 8,467,133 | B2 | 6/2013 | Miller |
| 8,472,120 | B2 | 6/2013 | Border et al. |
| 8,477,425 | B2 | 7/2013 | Border et al. |
| 8,482,859 | B2 | 7/2013 | Border et al. |
| 8,488,246 | B2 | 7/2013 | Border et al. |
| 8,490,148 | B2 | 7/2013 | Sikka et al. |
| 8,527,313 | B2 | 9/2013 | Beringer et al. |
| 2003/0040997 | A1* | 2/2003 | Rousseau et al. ............... 705/35 |
| 2003/0188291 | A1* | 10/2003 | Fisher ........................... 717/102 |
| 2004/0015819 | A1* | 1/2004 | Romano-Critchley et al. ........................... 717/102 |
| 2004/0250257 | A1* | 12/2004 | Koutyrine et al. ............ 719/315 |
| 2006/0248467 | A1* | 11/2006 | Elvanoglu et al. ............ 715/744 |
| 2007/0300185 | A1 | 12/2007 | Macbeth et al. |
| 2008/0104140 | A1* | 5/2008 | Vierich et al. ................ 707/202 |
| 2008/0148221 | A1 | 6/2008 | Letkeman et al. |
| 2008/0178102 | A1 | 7/2008 | Kannan et al. |
| 2008/0275910 | A1 | 11/2008 | Molina-Moreno et al. |
| 2009/0217100 | A1 | 8/2009 | Grechanik et al. |
| 2009/0217182 | A1 | 8/2009 | Grechanik et al. |
| 2009/0217302 | A1 | 8/2009 | Grechanik et al. |
| 2010/0222000 | A1 | 9/2010 | Sauer et al. |
| 2011/0153293 | A1* | 6/2011 | Coldicott et al. ................. 703/6 |
| 2011/0208855 | A1 | 8/2011 | Robertson et al. |
| 2012/0030612 | A1 | 2/2012 | Aziz et al. |
| 2012/0124494 | A1 | 5/2012 | Grechanik et al. |

OTHER PUBLICATIONS

Tai, H.; Mitsui, K.; Nerome, T.; Abe, M.; Ono, K.; Hori, M., "Model-driven development of large-scale Web applications," IBM Journal of Research and Development, vol. 48, No. 5.6, pp. 797,809, Sep. 2004.*

Extended European Search Report issued in European Application No. 12000578.0 on Jul. 26, 2012; 7 pages.

Jouault, Frederic et al.; "Transforming Models with ATL"; Satellite Events at the Models 2005 Conference; Lecture Notes in Computer Science; Jan. 2006; pp. 128-138.

Office Action issued in U.S. Appl. No. 13/018,106 on Dec. 21, 2012; 28 pages.

Office Action issued in U.S. Appl. No. 13/018,106 on Jul. 19, 2013; 30 pages.

Office Action issued in U.S. Appl. No. 13/017,428 on Jun. 6, 2013; 22 pages.

Office Action issued in U.S. Appl. No. 13/017,428 on Sep. 25, 2013; 27 pages.

Office Action issued in U.S. Appl. No. 13/017,790 on Jun. 6, 2014; 35 pages.

Office Action issued in U.S. Appl. No. 13/017,920 on Jun. 26, 2014; 28 pages.

Office Action issued in U.S. Appl. No. 13/018,106 on Jun. 19, 2014; 36 pages.

Office Action issued in U.S. Appl. No. 13/018,106 on Oct. 10, 2014; 36 pages.

* cited by examiner

FIG. 3A

```xml
<Handler id="026"
    type ="modification"
    name="Set Authorization Classification"
    implementation="SAP_BYD_LS_UI_Checkmate_Core_Modifications_SAP_026
    _SetAuthorizationClassificationCode"
    status="productive">
    <Description> Set the authorizationClassificationCode attribute
    according to the different UI Component types</Description>
    <Scopes>
        <Scope UIType="OWL"/>
        <Scope UIType="FS"/>
        <Scope UIType="OIF"/>
        <Scope UIType="QA"/>
        <Scope UIType="WCF"/>
        <Scope UIType="GAF"/>
        <Scope UIType="WCVIEW"/>
        <Scope UIType="EC"/>
        <Scope UIType="PTP"/>
        <Scope UIType="MD"/>
        <Scope UIType="OVS"/>
        <Scope UIType="TaskListView"/>
    </Scopes>
    <Columns>
        <Column title="message"/>
    </Columns>
</Handler>
...
```

FIG. 5A

```
foreach (string[] detailsAreTitle in detailsAreArticles)
{
    if (results.Count == 0)
    {
        //results.Add(new ScanRuleResult(HandlerResult.Category.VIOLATION, 10, element.Attribute("id").Value.ToString()
        // check if the title is created with a calculation Rule that was could not be identified
        if (detailsAreTitle[0].Contains("999") == true)
        {
            results.Add(new ScanRuleResult(HandlerResult.Category.INFORMATION, Priority.MEDIUM, 2, Rulelog_R117_02));
            return results;
        }
        // check if title starts with "Details"
        if (detailsAreTitle[1].StartsWith("Details") == false)
            results.Add(new ScanRuleResult(HandlerResult.Category.VIOLATION, Priority.HIGH, 1, Rulelog_R117_01));
    }
}
```

FIG. 5B

| App | UI Type | Category | Priority | Attribute | Error Message |
|---|---|---|---|---|---|
| HC | OWL | VIOLATION | HIGH | Controller/Queries/Query{name=Query} | Query Query does not contain queryPath attribute |
| TEST | OWL | WARNING | MEDIUM | Controller/TextPool/TextBlockController/TextPoolEntry{uuid=xxOru4} | Text pool entry with UUID='xxOru4' doesn't have an ESR text ID specified nor a local text is maintained. |
| TEST | OWL | WARNING | MEDIUM | Controller/TextPool/TextBlockController/TextPoolEntry{uuid=Lcather} | Text pool entry with UUID='Lcather' doesn't have an ESR text ID specified nor a local text is maintained. |
| TEST | OWL | VIOLATION | HIGH | DataModel{name=Root}/Structure{name=QueryPara}/DataField{name=Description} | DataField 'Description' is used more than once in Query(s): 'Query' |
| Support | FS | WARNING | MEDIUM | Controller/TextPool/TextBlockController/TextPoolEntry{uuid=oxbxW8} | Text pool entry with UUID='oxbxW8' doesn't have an ESR text ID specified nor a local text is maintained. |

FIG. 8A

| Count of issue_id | | | Total |
|---|---|---|---|
| message | area | sub_area | |
| Button 'Close' recognized as generic button and placed incorrectly; place it according to the styleguide | | | 8 |
| Button 'New' recognized as generic button and placed incorrectly; place it according to the styleguide | | | 1 |
| Button 'Preview' recognized as generic button and placed incorrectly; place it according to the styleguide | | | 2 |
| Button 'Save and Close' recognized as generic button and placed incorrectly; place it according to the styleguide | | | 3 |
| 'Close' button in the 'ActionButtons' group is in the wrong position; place it at the last position | | | 1 |
| Mandatory 'Close' button missing on the toolbar or placed incorrectly; place it in 'Action Buttons' group | | | 14 |
| Mandatory F-Action or 'Save and Close' button is missing or at the wrong position; place it at the first position | | 01 UI | 4 |
| | | 02 XT | 4 |
| | | 03 ECO | 27 |
| | | 06 LOG | 8 |
| | | 07 FIN | 18 |
| | | 08 FIN | 2 |
| | | 09 GLO | 1 |
| | | 10 LCM | 3 |
| | | not assigned | 30 |
| Mandatory F-Action or 'Save and Close' button is missing or at the wrong position; place it at the first position Total | | | 97 |
| Mandatory 'New' button missing on the toolbar or placed incorrectly; place it in 'Related Action Buttons' group | | | 207 |
| 'Print' button placed incorrectly; use only 'Preview' in StandardButtons group | | | 2 |
| 'Send' button placed incorrectly; use only 'Preview' in StandardButtons group | | | 10 |
| 'Send E-Mail' button placed incorrectly; use only 'Preview' in StandardButtons group | | 02 XT | 1 |
| 'Send E-Mail' button placed incorrectly; use only 'Preview' in StandardButtons group Total | | | 1 |
| Grand Total | | | 246 |

FIG. 8C

UNIFIED INTERFACE FOR META MODEL CHECKING, MODIFYING, AND REPORTING

TECHNICAL FIELD

This present disclosure relates to software models, and more particularly to handling checking, modifying, and reporting attributes of software models.

BACKGROUND

Meta modeling in software engineering includes the analysis, construction, development, and analysis of rules, guidelines, constraints, models and theories applicable and useful for modeling a known class of problems, components, or structures. Software models can model software components, such as user interfaces (UIs), applets, objects, interfaces, and other components, including the relationships between software components and systems. Some software models used in modern software systems can be based on model schemas defining how the model is organized, such as template-based models. Additionally, software structures and components modeled by software models can be subject to semantical rules and guidelines dictating certain requirements for the components not otherwise checked by the schema of the model. For example, UIs can be subject to style guide rules dictating rules and preferences for the layout, formatting, organization of UIs in a system.

SUMMARY

This disclosure provides various embodiments for performing operations on entities of a meta model modeling one or more software components. A request can be received to perform a particular operation of a particular type on each of a plurality of model entities included in at least one digital meta model, each model entity modeling at least one attribute of a respective software component, where the request includes an identification of the particular type of operation, and the particular type is one of a plurality of operation types. The plurality of model entities can be retrieved from at least one memory device in response to the request. A handler object can be instantiated of the particular type adapted to perform the particular operation by calling a set of reusable software modules from a plurality of reusable software modules stored in at least one memory device, each software module providing functionality used to perform at least a portion of the particular operation on at least one entity in the plurality of entities. Result data can be generated based on the performance of the particular operation using the instantiated handler and the set of reusable software modules.

While generally described as computer implemented software that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 3A is a representation of a snippet of an example parsable UI model data file.

FIG. 5A is a representation of a snippet of an example model consistency operation handler.

FIG. 5B is a representation of a snippet of an example handler object adapted for use in checking one or more model entities.

FIGS. 8A-8C illustrate example screenshots of user interfaces used in connection with an example model consistency engine.

Like reference symbols in the various drawings indicate like elements.

DETAILED DESCRIPTION

In some software environments, a set of rules can be maintained for models modeling various software components in the environment to ensure consistency of models across the environment. In typical systems, violations of consistency rules can involve users conducting individual checks of models to uncover violations. Further, modifying the models (and/or software components modeled by the models) can involve developers accessing and manually correcting the models in order to bring the models into conformance with consistency rules. To assist in improving a development cycle involving software models, a model consistency engine can be provided with functionality allowing for batch checking of models for conformance with consistency rules. Building on these consistency checks, modification operations can be further provided, accessing models in the system and performing batch modifications of a plurality of models, for example, to bring the model into conformance with consistency rules. Reporting operations can additionally be performed on the plurality of models to generate statistical measures relating to models' conformance with one or more consistency rules.

Consistency checks, model modifications, and model consistency reporting can be implemented using a unified interface. The interface can be implemented using handlers instantiated from a common handler class and making use of a library of reusable software helper classes, methods, and module that can be utilized by handlers to perform tasks relating to particular consistency checks, model modifications, and model consistency reporting. With common services offered through a model consistency engine and the library of reusable modules, a robust set of consistency operations can be developed while allowing developers to focus consistency operation development efforts on a specific check, modification, or report operation to the functionality of the model consistency engine.

Figure 1:
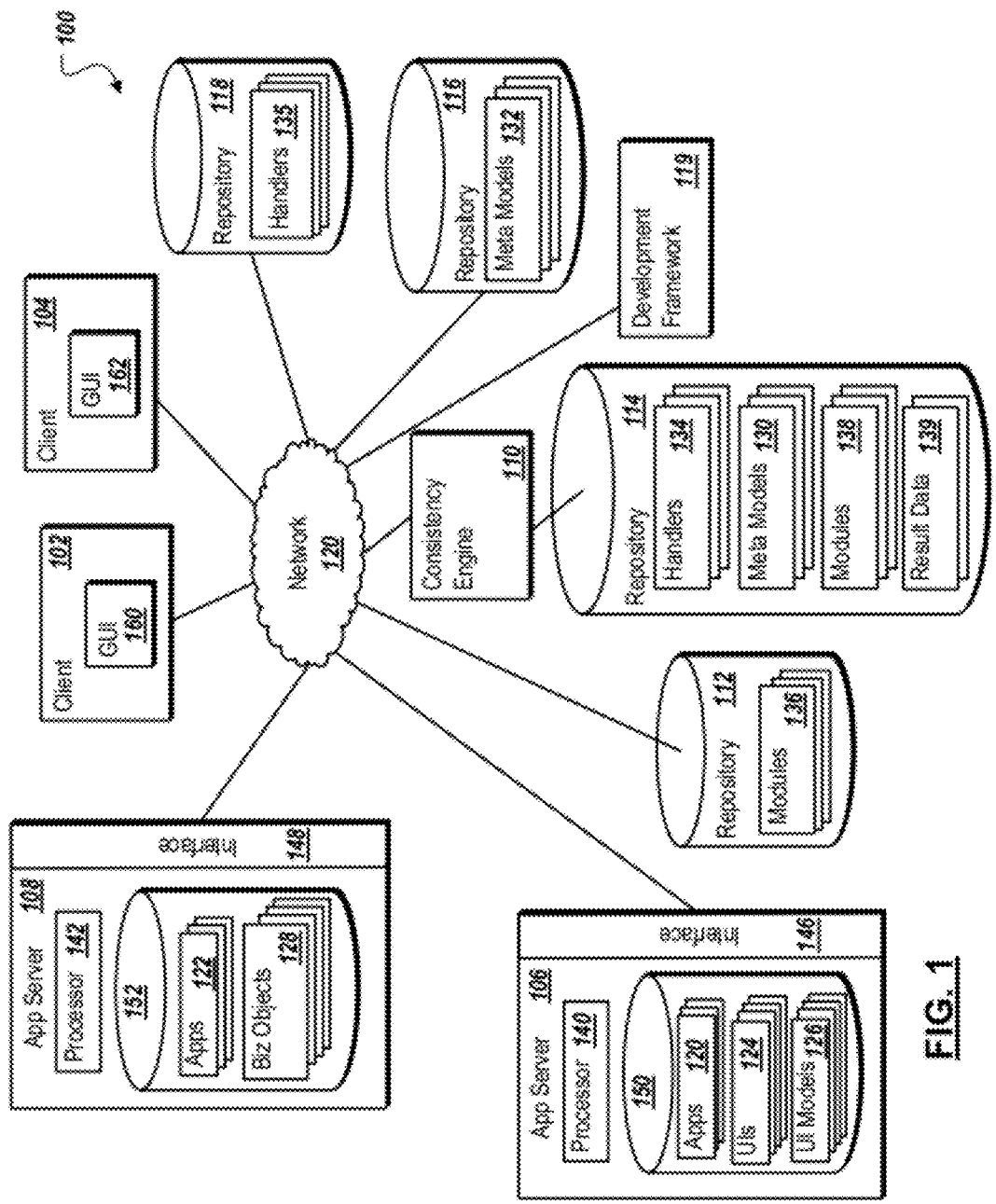
FIG. 1 illustrates an example system including an example meta model consistency engine.

Turning to the example implementation of FIG. 1, the illustrated software environment 100 includes, or is communicably coupled with, one or more clients 102, 104, one or more application servers (e.g., 106, 108), such as application servers within an enterprise software environment, and one or more data repositories (e.g., 112, 114, 116, 118), using one or more networks 120. The environment 100 can further include a model consistency engine 110 adapted to manage and facilitate tasks and operations related to maintaining and monitoring the consistency of multiple software meta-models (e.g., 126, 128, 130, 132) within the software environment 100, as well as in connection with one or more software development tools 119. Each of servers 106, 108, model consistency engine 110, and development tool 119 can comprise electronic computing devices operable to receive, transmit, process, store, or manage data and information associated with the software environment 100. As used in this document, the term "computer" is intended to encompass any suitable processing device. For example, the environment 100 may be implemented using computers other than servers, including a server pool. Further, any, all, or some of the servers 106, 108 may be adapted to execute any operating system, including Linux, UNIX, Windows Server, or any other suitable operating system.

Model consistency engine 110 can access, perform checks on, and modify one or more meta-models, including software user interface models ("UI models") (e.g., 126), business objects (e.g., 128), and other meta-models (e.g., 130, 132), such as flexible entities, stored in and/or served by one or more data storage devices (e.g., 114, 116, 150, 152). Further, model consistency engine 110 can further access and use consistency operation handlers (e.g., 134, 135) adapted to perform operations relating to checking, modifying, and generating reports relating to the plurality of meta-models and managing meta-models' consistency with one or more consistency rules. For example, the model consistency engine can call and initiate execution of one or more check-type operation handlers to parse one or more UI models (e.g., 126) to determine whether software application user interfaces (or "UIs") (e.g., 124) modeled by the UI models (e.g., 126) satisfy particular UI-related rules, such as style guide rules relating to layout and formatting of UIs in a particular application (e.g., 120), software suite, or computing environment, such as an enterprise software environment. Result data (e.g., 139) can be generated based on operations performed using the model consistency engine 110 and one or more operation handlers (e.g., 134, 135). Result data can also be used by operation handlers (e.g., 134, 135) in the completion of various consistency operations, such as a report generation by reporting-type operation handlers.

Operation handlers (e.g., 134, 135) can be developed to handle a variety of tasks relating to the management of software models (e.g., 126, 128, 130, 132) within a software environment 100. In some instances, operation handlers can be instantiations of a single class, providing for a single interface to consistency operations and model access, thereby simplifying development, deployment, and implementation of new handlers. Indeed, the class can provide for the creation of multiple handlers, including handlers of different types. For instance, model checking handlers, model modification handlers, and model reporting handlers can all be instantiated from a single handler class. Indeed, in some instances, the functionality of the plurality of operation handlers (e.g., 134, 135) can overlap, with multiple operation handlers, including handlers of different types, utilizing common functions to complete their respective operations. Reusable modules 136 providing such functionality can be accessed by the handlers 134, 135 from a library of helper modules to assist the handlers in completing their respective operations. For instance, helper modules can include methods used and reused in connection with the performance of various check, reporting, and modification operations. For instance, helper modules can provide methods for retrieving particular model entities from one or more meta models, such as individual elements, lines, or snippets of XML included in an XML model file. Other helper methods can include method for querying model attributes and paths, such as paths to the model or software components modeled by the model and model entities.

In some instances, model consistency engine 110 can operate in connection with one or more software development tools 119. A software development tool 119 can include software and systems adapted to develop, generate, and modify software components, including UIs, applications, and data structures. In some instances, software development tool can generate and modify corresponding software models. In other words, development tasks can generate or affect underlying models relating to the development effort. For instance, UI development tool can be used to build software UIs for an application. Each UI can have an underlying UI model defining attributes of the developed UI. Accordingly, changes made by the user toward a particular UI through the development tool can be automatically reflected in the UI model defining attributes of the modified UI. Integrating or otherwise using the model consistency engine 110 with development tools 119 can assist developers, for example by providing them with instant feedback regarding a design decision consistency with existing consistency rules (e.g., through check operation handlers), in making changes to multiple models (e.g., through model modification handlers), among other examples.

Application servers 106, 108 can each include one or more processors 140, 142, at least one interface 146, 148, and computer-readable memory 150, 152. Application servers can be configured to serve web services (e.g., 120, 122) making use of one or more software models, such as UI models 126 or business object 128. In some instances, some combination of application servers 106, 108 can be hosted on a common computing system, server, or server pool, and share computing resources, including shared memory, processors, and interfaces, such as in an enterprise software system serving services to a plurality of distinct clients and customers. The interfaces 146, 148 can be used for communicating with other systems in a client-server or other distributed environment (including within environment 100) connected to the network 120, for example the one or more clients 102, 104, external data sources (e.g., 112, 116, 118), or any other computing device adapted to interface with the servers 106, 108, including devices not illustrated in FIG. 1. Generally, each interface 146, 148 comprises logic encoded in software and/or hardware in a suitable combination and operable to communicate with the network 120. More specifically, the interfaces 146, 148 may comprise software supporting one or more communication protocols associated with communications such that the network 120 or hardware is operable to communicate physical signals within and outside of the illustrated software environment 100.

Each processor 140, 142 can execute instructions and manipulate data to perform the operations of an associated server or system (e.g., 106, 108) and may comprise, for example, a central processing unit (CPU), a blade, an application specific integrated circuit (ASIC), or a field-programmable gate array (FPGA), among other suitable options. Although each processor 140, 142 is illustrated as a single processor, multiple processors may be used according to the particular needs of the associated server. References to a single processor 140, 142 are meant to include multiple processors where applicable. The operations that each processor 140, 142 executes are determined by the purpose and operations of its associated server. Generally, the processor 140, 142 executes instructions and manipulates data to perform the operations of its respective server and, specifically, the software systems, services, and applications hosted by the servers 106, 108.

At a high level, each "server" (e.g., 106, 108) includes one or more electronic computing devices operable to receive, transmit, process, store, or manage data and information associated with the environment 100. Specifically, a server is responsible for receiving requests from one or more clients and sending the appropriate response to the requesting client. In addition to requests from external clients, requests may also be sent from internal users, external or third-party customers, other automated applications, as well as any other appropriate entities, individuals, systems, or computers. For example, although FIG. 1 illustrates each server as a single server, a server can be implemented using two or more servers, as well as computers other than servers, including a server pool. Indeed, a server may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, servers may be adapted to execute any operating system, including Linux, UNIX, Windows, Mac OS, or any other suitable operating system.

In the case of servers hosting, serving, or otherwise providing software services or products, a processor (e.g., 140, 142) can execute the functionality required to receive and respond to requests from clients, as well as client applications interfacing with the server's hosted application (e.g., 120, 122). It will be understood that the term "application server" (e.g., 106, 108) can include any suitable software component or module, or computing device(s) capable of hosting and/or serving a software application, including distributed, enterprise, or cloud-based software applications. Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, Visual Basic, assembler, Perl, any suitable version of 4GL, as well as others. Applications can be implemented as individual modules that implement the various features and functionality through various objects, methods, or other processes, or may instead include a number of sub-modules, third party services, components, libraries, and such, as appropriate. Conversely, the features and functionality of various components can be combined into single components as appropriate.

At a high level, each of the one or more hosted applications and services (e.g., 120, 122) illustrated in the environment 100 can include any application, program, module, process, or other software that may execute, change, delete, generate, or otherwise manage information according to the present disclosure, particularly in response to and in connection with one or more requests received from the illustrated clients 102, 104, as well as other applications. In certain cases, only one hosted application may be located at a particular server. In others, a plurality of related and/or unrelated hosted applications may be stored at a single server, or located across a plurality of other servers, as well. In certain cases, environment 100 may implement a composite hosted application. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, applications may represent web-based applications accessed and executed via the network 120 (e.g., through the Internet). Further, one or more processes associated with a particular hosted application or service may be stored, referenced, or executed remotely. For example, a portion of a particular hosted application or service may be a web service associated with the application that is remotely called, while another portion of the hosted application may be an interface object or agent bundled for processing at a remote client (e.g., 102, 104). Moreover, any or all of the hosted applications and software service may be a child or sub-module of another software module or enterprise application (not illustrated) without departing from the scope of this disclosure. Still further, portions of a hosted application can be executed by a user working directly at a server hosting the application, as well as remotely at a client.

Each of the example servers 106, 108 can also include a memory (150, 152 respectively). Further repositories 112, 114, 116, 118 and client computing devices (e.g., 102, 104) can also each include at least one memory device. Each memory may include any memory or database module and may take the form of volatile or non-volatile memory including, without limitation, non-transitory memory elements, magnetic media, optical media, random access memory (RAM), read-only memory (ROM), removable media, or any other suitable local or remote memory component. Each memory may further store various objects or data, including classes, frameworks, applications, backup data, business objects, jobs, web pages, web page templates, database tables, content repositories storing business or other dynamic information, or other information including any parameters, variables, algorithms, instructions, rules, constraints, or references thereto relevant to the purposes of the particular server. Each memory may also include any other appropriate data, such as VPN applications, firmware logs and policies, firewall policies, a security or access log, print or other reporting files, as well as others. Again, the particular data and instructions stored in each memory (e.g., 112, 114, 116, 118, 150, 152) will be described in detail below in connection with the illustrated implementations of the software environment 100 and components thereof.

Generally, the network 120 facilitates wireless or wireline communications between the components of the software environment 100 (e.g., between the model consistency engine 110, data repositories 112, 114, 116, 118, and one or more clients (e.g., 102, 104) as well as between other components as appropriate), as well as with any other local or remote computer, such as those associated with one or more applications or external data sources. The network 120 can be implemented as one or more distinct networks. In any implementation, the network 120 may be a continuous or discontinuous network without departing from the scope of this disclosure, so long as at least a portion of the network 120 may facilitate communications between senders and recipients. The network 120 may be all or a portion of an enterprise or secured network. As an example, in FIG. 1 networks 120 may represent a portion of an enterprise network, or a connection to the Internet. In some instances, a portion of the network 120 may be a virtual private network (VPN). All or a portion of the network 120 can comprise either a wireline or wireless link. Example wireless links may include 802.11a/b/g/n, 802.20, WiMax, and/or any other appropriate wireless link. In other words, the network 120 encompasses any internal or external network, networks, sub-network, or combination thereof operable to facilitate communications between various computing components inside and outside the illustrated environment 100. The network 120 may communicate, for example, Internet Protocol (IP) packets, Frame Relay frames, Asynchronous Transfer Mode (ATM) cells, voice, video, data, and other suitable information between network addresses. The network 120 may also include one or more local area networks (LANs), radio access networks (RANs), metropolitan area networks (MANs), wide area networks (WANs), all or a portion of the Internet, and/or any other communication system or systems at one or more locations.

The illustrated implementation of FIG. 1 includes one or more local and/or remote clients 102, 104. A client 102, 104 can be any computing device operable to connect or communicate at least with an application server 106, 108, and/or the network 120 using a wireline or wireless connection. Each client 102, 104 includes at least one GUI (e.g., 160, 162). In general, the client 102, 104 comprises an electronic computing device operable to receive, transmit, process, and store any appropriate data associated with the software environment of FIG. 1, including model consistency engine 110 and development tools 119. It will be understood that there may be any number of clients 102, 104 associated with environment 100, as well as any number of clients 102, 104 external to environment 100. Further, the term "client" and "user" may be used interchangeably as appropriate without departing from the scope of this disclosure. Moreover, while each client 102, 104 is described in terms of being used by one user, this disclosure contemplates that many users may use one computer or that one user may use multiple computers. As used in this disclosure, the client 102, 104 is intended to encompass a personal computer, electronic notepad, touch screen terminal, workstation, network computer, kiosk, wireless data port, smart phone, personal data assistant (PDA), one or more processors within these or other devices, or any other suitable processing device. For example, the client 102, 104 may comprise a computer that includes an input device, such as a keypad, touch screen, mouse, or other device that can accept information, and an output device that conveys information associated with operations of one or more applications stored and/or executed on an application server (or other servers in environment 100) or on the client 102, 104 itself, including digital data, visual information, or GUI 160, 162. Both the input device and the output device may include fixed or removable storage media such as a magnetic computer disk, CD-ROM, or other suitable media to both receive input from and provide output to users of the clients 102, 104 through the display, namely the GUI 160, 162.

The GUI 160, 162 comprises a graphical user interface operable to allow the user to interface with at least a portion of environment 100 for any suitable purpose, including allowing a user to interact with one or more software applications and services (e.g., 120, 122). Generally, the GUI 160, 162 provides users with an efficient and user-friendly presentation of data provided by or communicated within the system. The term "graphical user interface," or GUI, may be used in the singular or in the plural to describe one or more graphical user interfaces and each of the displays of a particular graphical user interface. Therefore, the GUI 160, 162 can be any graphical user interface, such as a web browser, touch screen, or command line interface (CLI) that processes information in the environment 100 and efficiently presents the results to the user. In general, UIs displayed using the GUI 160, 162 may include a plurality of user interface (UI) elements such as interactive fields, pull-down lists, media players, tables, graphics, virtual machine interfaces, buttons, etc. operable by the user at the client. These UI elements may be related to the functions of one or more applications or services (e.g., 120, 122), including applications hosted locally at the client.

While FIG. 1 is described as containing or being associated with a plurality of elements, not all elements illustrated within environment 100 of FIG. 1 may be utilized in each alternative implementation of the present disclosure. Additionally, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
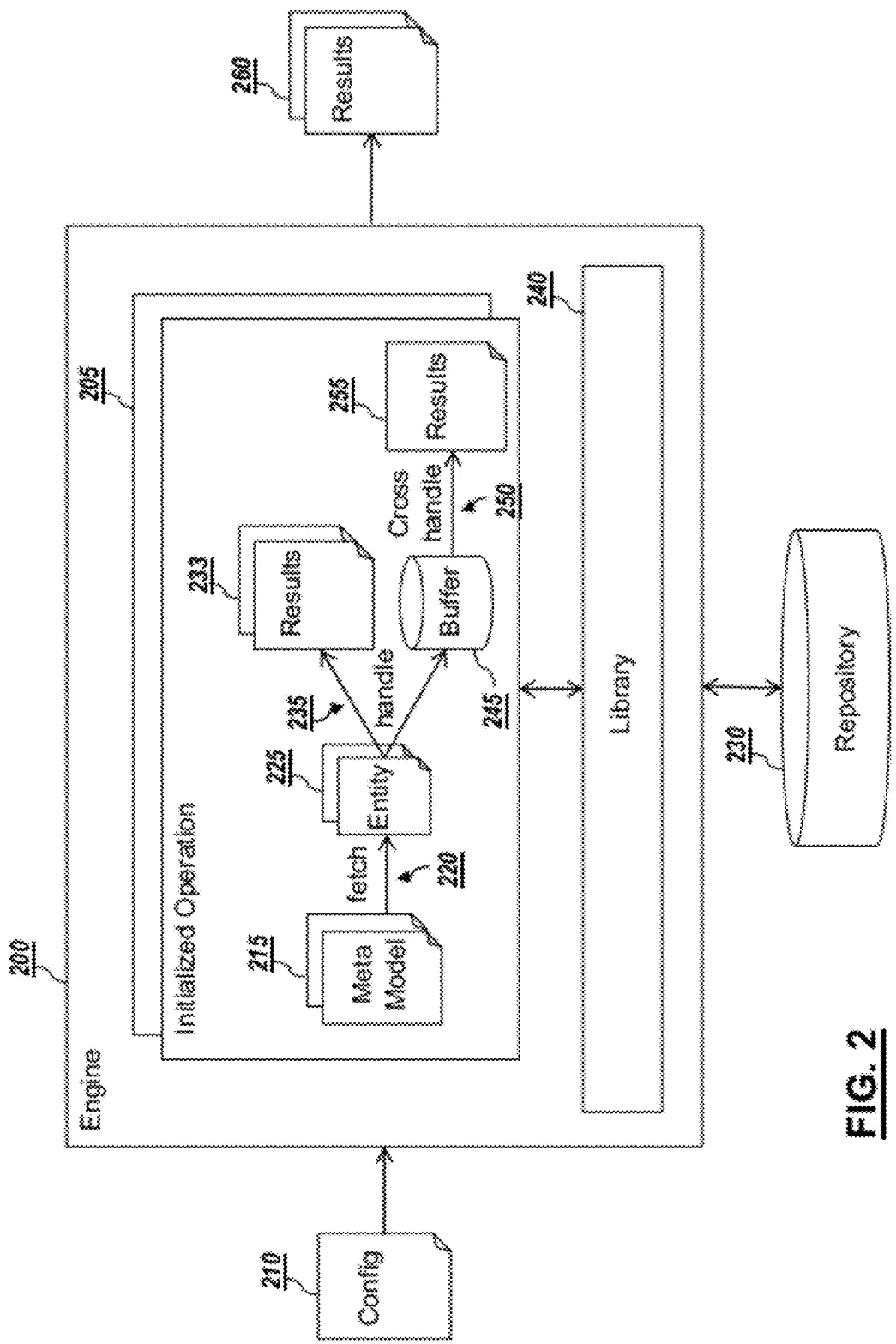
FIG. 2 is a schematic representation of an example model consistency engine.

FIG. 2 is a schematic representation of an example model consistency engine 200. The model consistency engine 200 can initiate one or more operations 205, initialized, for example, according to one or more configurations 210 received for the operation. A configuration 210 can include metadata of one or more handlers for use in identifying the handlers needed to perform particular operations on a set of models 215. For instance, configuration 210 can identify the type, name, implementation, status, description, and scope of the particular handler (see, e.g., FIG. 5A and accompanying description). The model consistency engine 200 can access a plurality of models 215, parse the models 215 to access and fetch 220 individual model entities 225 included in the models 215 and modeling specific attributes of a particular software component, concept, or entity. Model entities 225 included in a particular model 215 can be defined by the schema of the model and the nature of the software component or concepts being modeled by the model 215. One or both of the models 215 and modeled software entities 225 can be retrieved from one or more data repositories 230. Handle methods 235 (realized, for example, by implementations of operation handlers as described herein) can make use of a library 240 of reusable, common functionality modules to perform check, report, and/or modification operations using or based on the retrieved entities 225 and generate result data 233 based on the operation. By consolidating consistency operation logic in a common model consistency engine and a library 240 of reusable functionality modules, much of the interface programming and common functionality is resolved prior to the development of a new handler. Such an infrastructure can further assist in making the development and implementation of new handlers more efficient.

Continuing with FIG. 2, in some instances, an operation can require processing of more than one model entity, such as when multiple entities in a single model are processed in connection with a consistency operation. For instance, a consistency check processing an entire UI model for UI components' compliance with one or more UI design rules can require processing of each of the components of the UI. A buffer 245 can be used to manage multiple results generated from the processing of each entity and a cross-handle method 250, adapted to consolidate or aggregate these results in processed result data 255 can be used. Result data 233, 255 generated based on the called handle method can be further processed and sent as results 260 for presentation to a user or for use and further processing by other software tasks and applications.

Software models can include parsable, digital files, including mark-up language files or code, such as XML, that model, describe, or define aspects of a particular software component or collection of software components. For example, FIG. 3A includes a representation of a snippet of an example parsable UI model data file. More specifically, the example of FIG. 3A illustrates a snippet 305 of an XML-based, parsable, digital UI model of a particular UI available for processing and parsing using one or more handle methods deployed using a model consistency engine, for example. The model can include a plurality of model entities (e.g., 306, 307, 308, 309) each modeling a particular attribute of the software component (in this case a UI title field) modeled by the mode. Further, as shown in FIG. 3A, a highlighted portion 315 (highlighted for purposes of convenience in illustrating the present example and not necessarily as a feature in an actual UI model) relates to text used in a title field of a particular UI element within a UI modeled by the UI model. In this example, the UI model specifies, in model entity 309 that a title field of the UI is to include the words "Details: Line Items of (0)," where "(0)" designates a placeholder for additional text. In an example of a check-type operation, this title field model entity could be checked, for example, using a handler adapted to check the consistency of UI titles against certain predefined guidelines, such as a requirement that all titles begin with the words "Details:". In this particular example, the highlighted title field attribute 315 in snippet 305 does begin with the word "Details:" and, as a result, if the UI model entity 309 of FIG. 3A were parsed and checked using a check-type operation handler checking that titles begin with the words "Details:", it would be identified that the highlighted title field attribute 315 (and model entity 309) conforms to the corresponding consistency rule (i.e., because the title begins with "Details:").

Figure 3B:
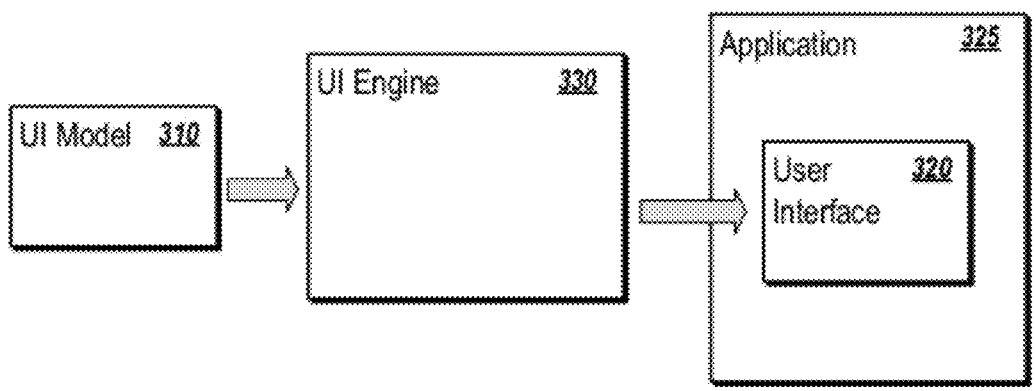
FIG. 3B is a representation of an example use of a digital UI model to generate a runtime UI.

While software models can often be utilized with the design-time context, software models can be used in runtime environments. For instance, as shown in FIG. 3B, an example UI model 310 can define components, attributes, and other features of a UI 320 of a particular software application 325. The UI model 310 can be an XML file, or some other parsable file, that can define and identify, to a UI generation engine 330, the attributes to be included in a particular UI. The UI model snippet 305 of FIG. 3A is but one example of a parsable UI model file. A UI generation engine 330 can build the UI 320 corresponding to and defined by the UI model 310 by parsing the UI model to identify the set of attributes defined for the UI and build the UI by constructing the UI from UI elements and definitions specified in the attributes defined in the UI model. In such examples, modifications made to the UI model 310 can propagate to the runtime instances of the corresponding UI 320, further illustrating the advantage to using such software models to implement batch checks of UI consistency against multiple UI as well as implement modifications, or edits, based, for example, on remedying UI inconsistencies across a set of UIs through the editing of models upon which the corresponding software component is based.

Figure 4:
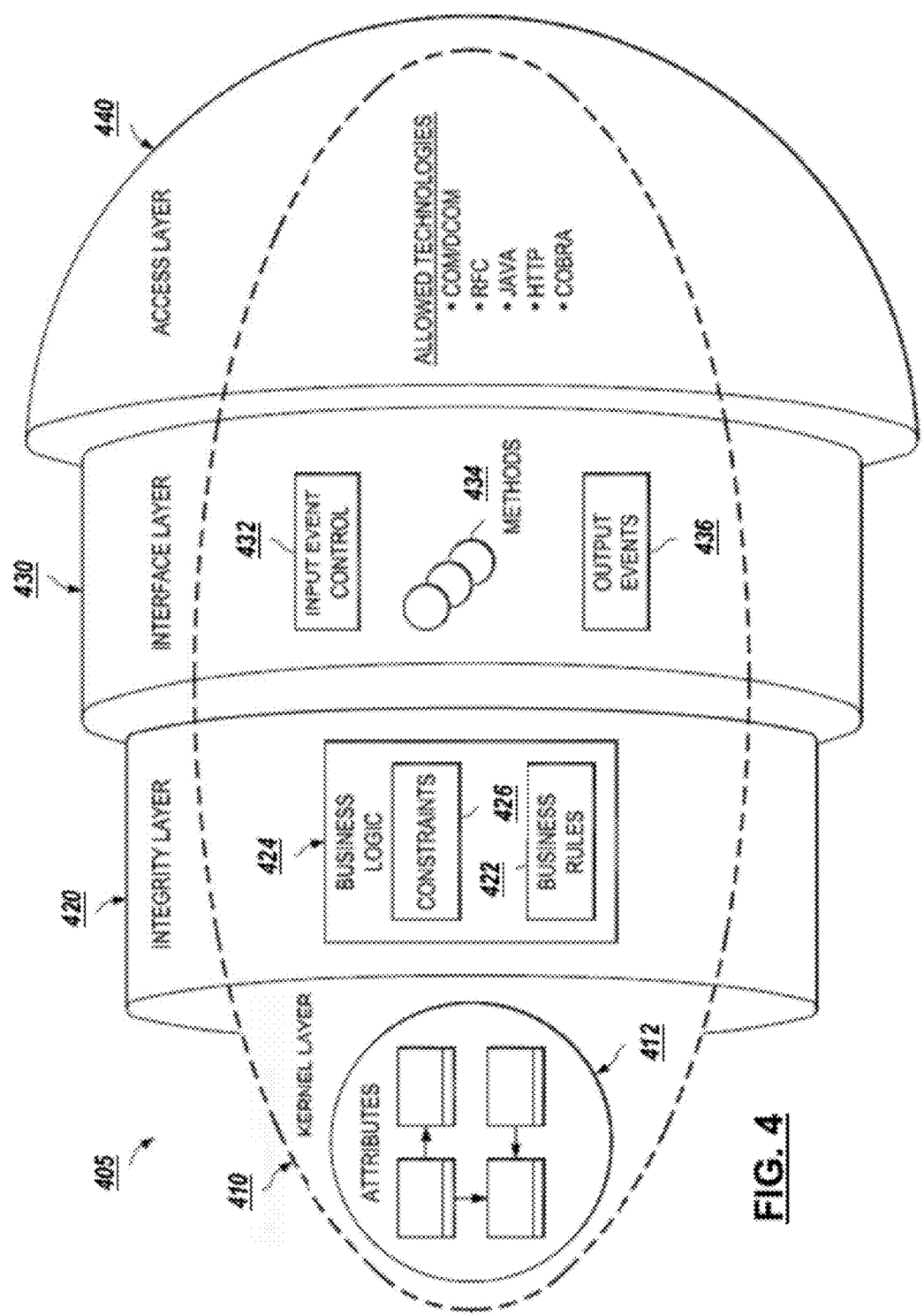
FIG. 4 is a representation of an example business object.

In other examples, data modeling a particular business case in a particular business object can be accessed, and in some cases, modified, by a runtime process. For instance, FIG. 4 illustrates the structure of a generic business object 405 in environment 100. In general, the overall structure of the business object model can ensure the consistency of the interfaces that are derived from the business object model. The derivation helps ensure that the same business-related subject matter or concept can be represented and structured in the same way in various interfaces. The business object model can define the business-related concepts at a central location for a number of business transactions. In other words, it reflects the decisions made about modeling the business entities of the real world acting in business transactions across industries and business areas. The business object model can be defined by the business objects and their relationship to each other (the overall net structure).

Each business object is thus a capsule with an internal hierarchical structure, behavior offered by its operations, and integrity constraints. Business objects are generally semantically disjointed, i.e., the same business information is represented once. In some embodiments, the business objects are arranged in an ordering framework such that they can be arranged according to their existence dependency to each other. For example, in a modeling environment, the customizing elements might be arranged on the left side of the business object model, the strategic elements might be arranged in the center of the business object model, and the operative elements might be arranged on the right side of the business object model. Similarly, the business objects can be arranged in this model from the top to the bottom based on defined order of the business areas, e.g., finance could be arranged at the top of the business object model with customer relationship management (CRM) below finance and supplier relationship management (SRM) below CRM. To help ensure the consistency of interfaces, the business object model may be built using standardized data types as well as packages to group related elements together, and package templates and entity templates to specify the arrangement of packages and entities within the structure.

A business object may be defined such that it contains multiple layers, such as in the example business object 405 of FIG. 4. The example business object 405 contains four layers: the kernel layer 410, the integrity layer 420, the interface layer 430, and the access layer 440. The innermost layer of the example business object is the kernel layer 410. The kernel layer 410 represents the business object's 405 inherent data, containing various attributes 412 of the defined business object. The second layer represents the integrity layer 420. In the example business object 405, the integrity layer 420 contains the business logic 424 of the object. Such logic may include business rules 422 for consistent embedding in the environment 100 and the constraints 426 regarding the values and domains that apply to the business object 405. Business logic 424 may comprise statements that define or constrain some aspect of the business, such that they are intended to assert business structure or to control or influence the behavior of the business entity. It may pertain to the facts recorded on data and constraints on changes to that data. In effect, business logic 424 may determine what data may, or may not, be recorded in business object 405. The third layer, the interface layer 430, may supply the valid options for accessing the business object 405 and describe the implementation, structure, and interface of the business object to the outside world. To do so, the interface layer 430 may contain methods 434, input event controls 432, and output events 436. The fourth and outermost layer of the business object 405 in FIG. 4 is the access layer 440. The access layer 440 defines the technologies that may be used for external access to the business object's 405 data. Some examples of allowed technologies may include COM/DCOM (Component Object Model/Distributed Component Object Model), CORBA (Common Object Request Broker Architecture), RFC (Remote Function Call), Hypertext Transfer Protocol (HTTP) C++, ABAP, and Java, among others. Additionally, business objects 405 of this embodiment may implement standard object-oriented technologies such as encapsulation, inheritance, and/or polymorphism.

FIG. 5A is a representation of a snippet 505 of an example meta model consistency operation handler. In this particular example, the handler object includes a type definition 510, corresponding to one of the plurality of operation types that can be instantiated from a common handler class. In this particular example, "type" can be defined as either "modification" (as in example of FIG. 5A) to define handlers adapted to perform modifications on models and/or model entities modeling software component attributes, "checking" to perform consistency checks on one or more models and/or model entities, or "reporting" to generate reporting data relating to model entities or models modeling the software component. The handler object can also include a reference 515 to the actual implementation, or code, embodying the logic executed by the handler object, such as the class path for the dynamic initialization of the handler to complete the operation. The handler implementation can include calls to reusable functionality modules maintained in a library of common functions for use by handlers instantiated through the handler object. For instance, FIG. 5B includes an example of a snippet 530 from an implementation of a checking handler adapted to check one or more model entities of a UI models to see if the corresponding UI includes UI title fields conforming to particular UI style guide rules for UI titles. For instance, highlighted segment 535 of snippet 530 includes code that checks whether a title field begins with the words "Details:", as in the example UI model described above in connection with FIG. 3A.

Returning to FIG. 5A, a title and description (e.g., 520) can be defined for the handler, adapted for presentation to users to assist users in identifying the purpose and function of a given handler. In this particular example, for instance, the handler is designed to modify UI models to "Set the authorizationClassificationCode attribute according to the different UI Component types." The handler object can further define the scope of the handler operation, or which models or sets of models for which the operation is intended. For instance, in the example of FIG. 5A directed to UI models, the models that are to be processed using the modification handler are UI models corresponding to UIs of certain types. Scope fields 525 identify and define which groups, types, or categories of models (in this case UI models of various UI types) for which the handler is intended and are to be processed when the handler is called. The scope field can also be used to direct a model consistency engine in fetching the set of models and model entities to be processed using the handler. Other fields and functionality can also be defined in handler objects, such as the status 540 of the handler specifying whether the handler is under development, test, validation, or if it can be used productively, together with other features not shown or described in connection with the present illustrative example of FIG. 5A.

Figure 6A:
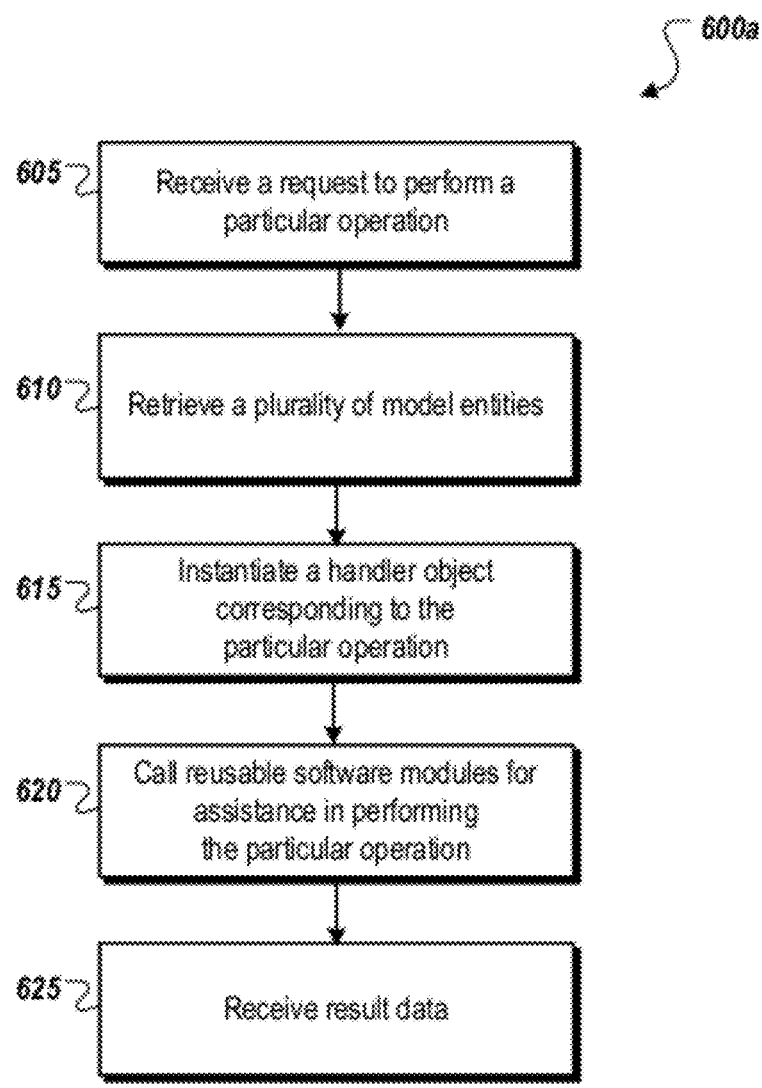
FIG. 6A is a flowchart of an example technique for performing a model consistency operation.

Turning to FIG. 6A, a flowchart 600a is shown of an example technique for performing a meta model consistency operation using one or more handler objects. A request can be received 605, for example, from a user or another program or process, to perform a particular operation of a particular type on each of a plurality of model entities modeling attributes of one or more software components, the plurality of model entities included in one or more digital meta models. The request 605 can include an identification of the particular type of operation. The particular type can be one of a defined set of operation types, such as operation types capable of being realized from handlers instantiated from a particular handler object class. Further, identification of a particular handler itself, can be used to identify the type of operation to be performed. Upon receiving 605 the request, the plurality of model entities can be fetched or retrieved 610. Retrieving 610 the model entities can involve the parsing of corresponding meta models to identify and fetch the model entities. A handler object can then be instantiated 615 to perform the particular operation by calling 620 reusable software modules from a library of software modules, the called modules performing at least a portion of the requested operation. In connection with the performance of the particular operation using the called handler and reusable modules, result data can be generated and received 625 based on the performance of the particular operation. Result data can include a summary of consistency check results, confirmation of a modification of one or more models in response to a modification operation, or generation of reporting data, among other examples.

Figure 6B:
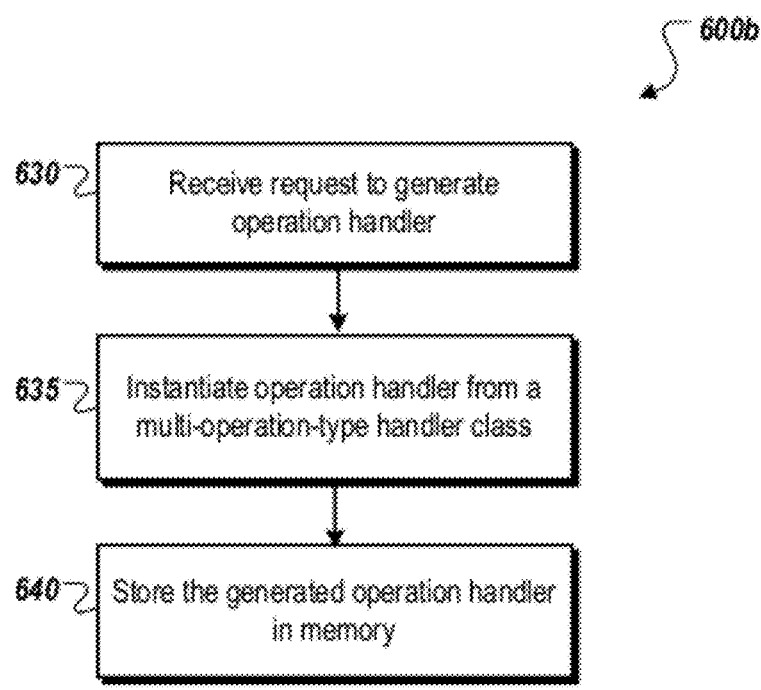
FIG. 6B is a flowchart of an example technique for generating a model consistency operation handler.

FIG. 6B illustrates a flowchart 600b of an example technique for generating a meta model consistency operation handler for use in connection with performing a consistency operation, such as described in connection with the flowchart 600a of FIG. 6A. For instance, operation handlers of varying types can be generated as instantiations of a common handler class. A request can be received 630 to generate a handler object for inclusion in a plurality of handler objects, the handler adapted for use in performing a particular operation of a first operation type on a plurality of model entities included in one or more models. The request can be directed to modifying an existing handler object or creating a new handler object. The received 630 request can include an identification of functionality modules from a plurality of reusable functionality modules, for use in performing the particular operation. Each functionality can be adapted to perform at least a portion of the particular operation on at least one of the model entities in the plurality of model entities operated upon in the operation. The handler can be instantiated 635 from a handler class, the handler adapted to call each functionality module in the first set of modules in connection with the performance of the particular operation. Further, the handler class can be adapted to serve as the basis for instantiating both handler objects adapted to perform operations of the first type as well as handler objects adapted to perform operations of a second operation type. The generated handler object can then be stored 640 in memory.

Figure 7:
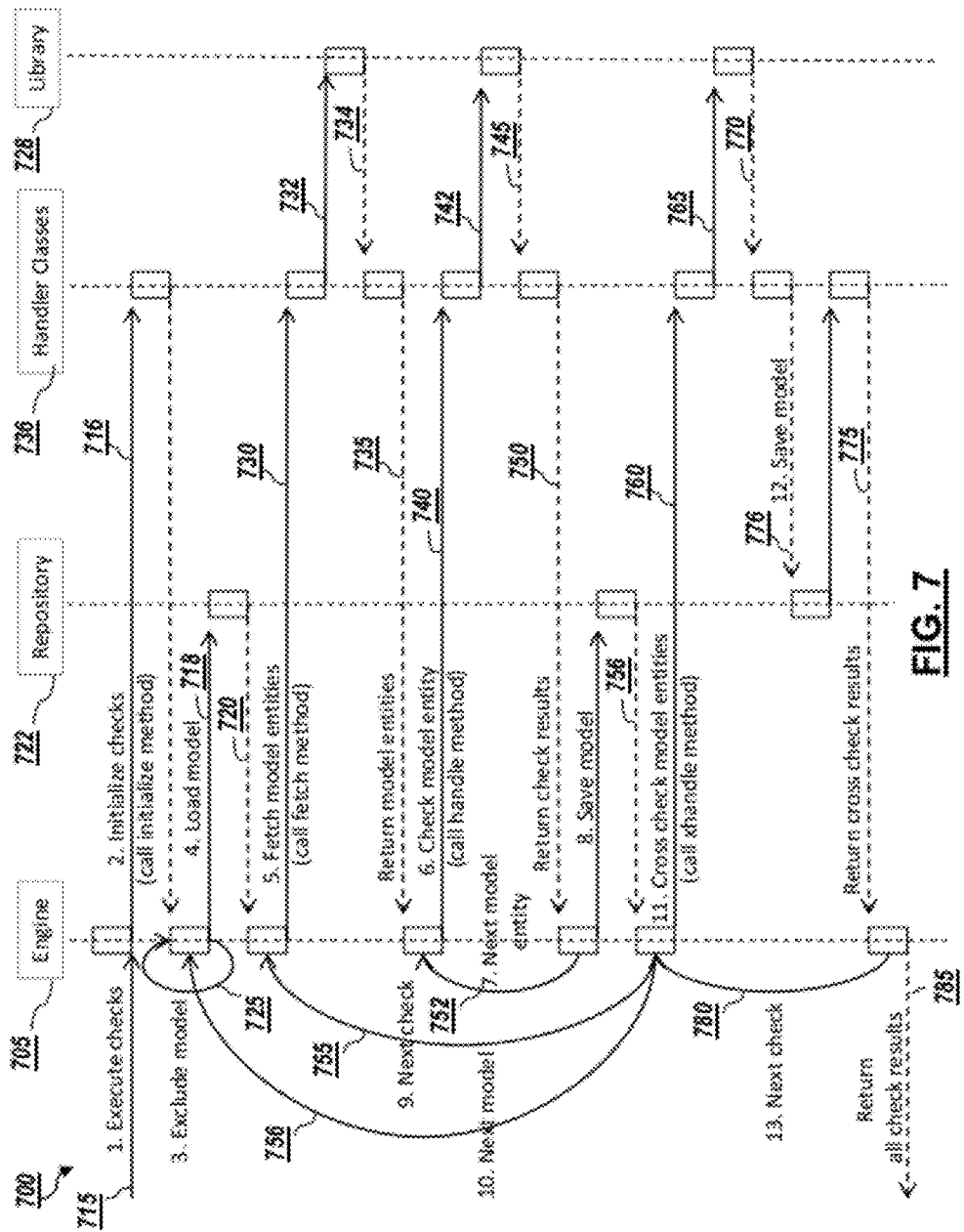
FIG. 7 is a diagram illustrating an example use of a model consistency engine.

FIG. 7 is a diagram 700 illustrating an example use of a model consistency engine 705 to perform one or more operations relating to maintaining or managing software model consistency. In the example of FIG. 7, a request is received 715 to execute one or more check-type operations on a plurality of models. For instance, the request can be received from a development tool against a model opened or accessed via the development tool, or in connection with a user request to perform a particular operation on one or more models. In some instances, handlers used to perform the check can be initialized 716. Models corresponding to the request can then be requested 718 and loaded 720 from one or more data repositories 722. While, in some instances, the particular models to be operated upon can be dynamically identified and loaded 720, in other instances, a set of models can first be loaded 720 and then filtered, with a portion excluded 725, for instance, by identifying that the particular operation is not relevant or intended for a particular model or model type. A fetch method can be called 730 using the handler to retrieve or fetch 735 particular model entities of the model from one or more libraries 728, implemented using one or more data storage devices. The fetch method, operation handlers, and other methods can be stored in one or more data stores 736 hosting the methods and available for use by the operation handler.

With the model entities returned 735, the handle method can be called 740 adapted to handle performing the called operation (e.g., 715) on each particular entity. The handler, at data store 736, in response to the handle method call 740, can make calls 742 to reusable software modules, methods, and constants stored in one or more libraries 728, the methods and modules operable to perform 745 at least portions of the called operation. In some instances, the particular reusable module called 742 by the handle can depend on the particular model entity to be operated on, with different modules being called to perform similar tasks on different entities, entity types, or entities of different model types. In some implementations, the same module can be reused by different handlers, including handlers of different types with shared functionality. For instance, a handler operable to fetch certain model entities can be reused by handlers of different types (e.g., by both a checking and modifying handler). The results of the operation (in this case check results) can then be returned 750 for the particular entity. With processing of the model entity complete, processing of the next fetched entity can be initiated 752. In some examples, at least two of the fetched model entities can be processed in parallel, for instance, by utilizing parallel processing hardware or by executing 745 different modules on the parallel-processed entities.

When each entity in a particular model has been processed by the handler, additional operations can be initiated 755 and performed on the entities and/or additional models loaded 756. Additionally, in some instances, versions of the model can be stored 758 (for instance in connection with a modification operation) to supplement or replace the original version of the model, prior to initiating 756 loading of the next model.

In some instances, a particular operation can aggregate or consolidate results from tasks and processing performed on multiple model entities of models modeling attributes of one or more software components. As described above, a cross-handle method can be called to handle performance of operation tasks that compile, aggregate, synthesize, or otherwise involve the results of multiple processed entities. Accordingly, in connection with such operations, a cross-handle method can be called 760 to initiate corresponding modules 765 used to produce results 770 for the cross-handle operation that can be returned 775 to the model consistency engine 705. Further results, and or modifications, can be saved (e.g., 776) in response to the performance of cross-handle operations. Further cross-handle checks can also be initiated 780, for example, to process a set of models, each with a plurality of entities, before concluding the requested operation. Result data (in this example, consistency check results) can then be returned 785 to a user or system, such as the user or system originally requesting 715 the operation.

Figure 8B:
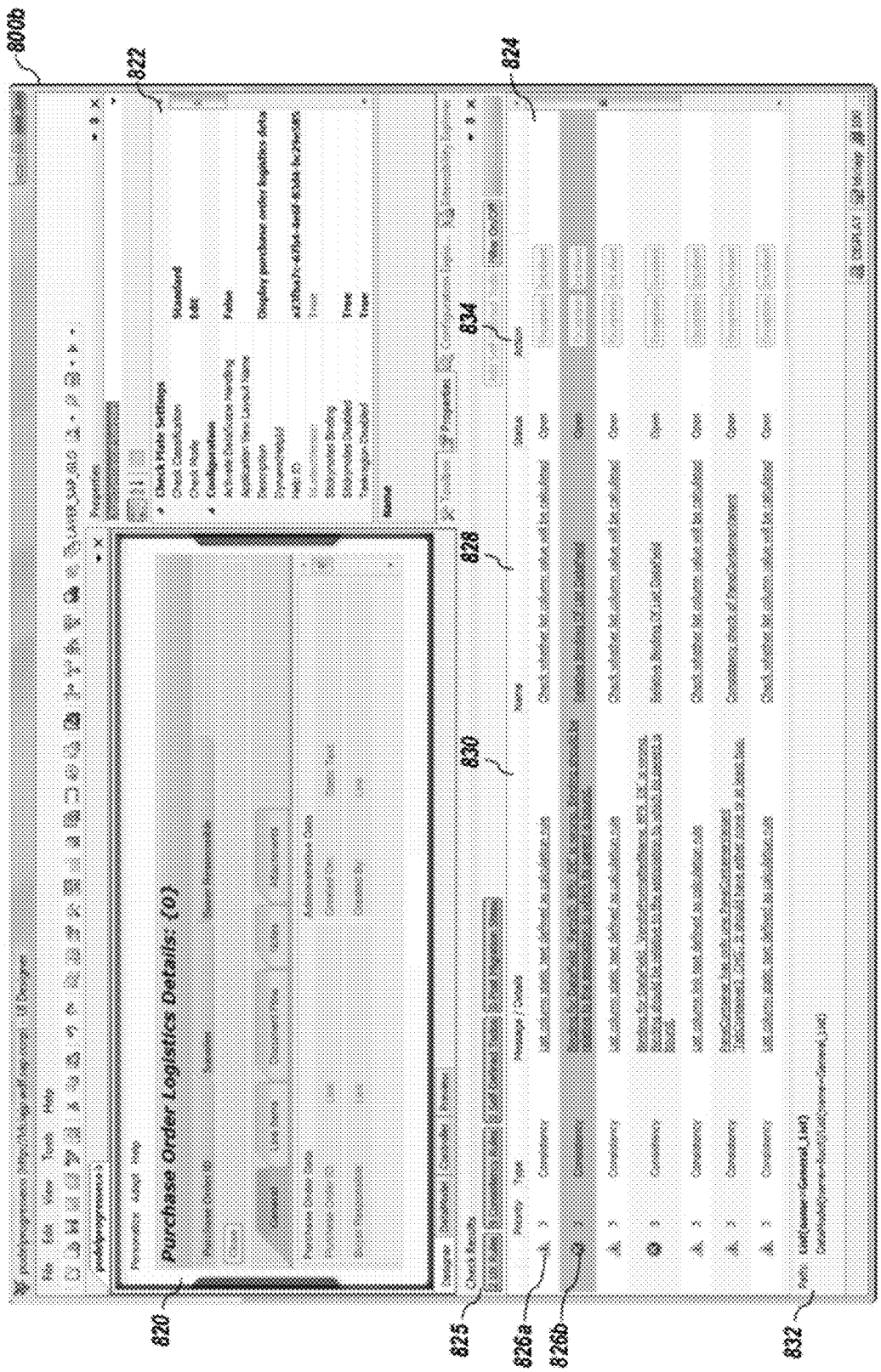

FIGS. 8A-8D illustrate example screenshots of user interfaces used in connection with an example model consistency engine. FIG. 8A, for example, illustrates a presentation of consistency check results relating to a check of UI models for consistency with a set of UI style guide rules. Varying levels of detail can be presented for results of a consistency check operation. In the example of FIG. 8A, at least a portion of a listing of style guide consistency check results is presented to a user. The listing, in this particular example, includes an identification of the offending UI component 802 modeled by a particular model entity as well as an identification 804 of the detected inconsistencies with the style guide rules. The UI component 802 can be but one of several components modeled by model entities in a particular UI model. Additionally, the listing of FIG. 8A can include check results of a plurality of UI elements modeled in a plurality of different UI models. Further, the particular check-type operation is not only tailored to checking a particular style guide rule, but also adapted to identify and present a calculated or assigned priority level 806 determined for the detected inconsistency or rule violation, as well as a message 808 describing the nature of the violation and/or violated UI style guide rule. The priority level 806 can be determined, for instance, by considering factors including how the offending UI attribute violated the corresponding UI style guide rule, how many times the rule was violated, a deployment schedule for the corresponding UI, or how many other violations were detected for a particular UI or UI attribute, among other examples.

As shown in the screenshot 800a of FIG. 8A, data can be maintained, generated, or identified, in connection with a check operation, relating to the nature and characteristics of a particular component 802. For instance, the type of UI 810 to which the UI component applies can be maintained, and presented in a listing of style guide consistency check results, for example, to assist the user in detecting style guide consistency trends across the set of results. Similarly, a software application affiliated with or using the offending UI can also be identified 812 through the particular check operation. Other check operations can identify, determine, or present alternate information, fields, and statistics, in connection with the checking of model entities. For instance, an operation can identify and generate result data including identification of the model or model entity associated with the component, an identification of the particular violated consistency rule, an address of the offending model, attribute, or modeled software component (e.g., the UI, in the case of a UI model), identification of developers responsible for developing or last-modifying the particular component or a corresponding model or model entity, the date of the component's or model's last modification, among other features.

Turning to FIG. 8B, a screenshot 800b is shown of an example interface of a development tool integrated with model consistency management functionality. In this example, one or more windows 820, 822 can be provided for use in modifying attributes and elements of a software component, in the case of FIG. 8B, elements and attributes of a UI developed using a UI development tool. In this particular example, a window 820 can be provided presenting a representation of the UI under development using the UI development tool. The window 820 can present a representation of the UI as it would be presented to a user. A user-developer can specify attributes of the UI by adjusting and defining UI components within the representation presented in window 820. Alternatively, a user can also specify UI component attributes in window 822. Further, modifications to the UI made in either window 820 or 822 can be reflected automatically in the other window. In other words, windows 820 and 822 can be alternative representations of the same model. For instance, a modification made to the UI representation in window 820 can change a corresponding attribute of the UI, the change being reflected automatically in window 822. Additionally, changes made to attributes of a particular UI using UI development tool windows 820 or 822 can result in a corresponding modifications being made to at least one particular UI model corresponding to the particular UI. The UI model can be parsed, for example, using a check operation provided through one or more operation handlers adapted to check the modified UI for compliance with one or more UI style guide rules, as in the example of FIG. 8A.

As shown in FIG. 8B, an additional window 824 can be presented to a user in connection with a UI development tool interface, the window 824 presenting results of at least one style guide consistency check, performed by a check-type operation handler on the UI developed using the UI development tool. A user can filter results of the style guide consistency analysis using controls 825, for example, to filter results by violation, warning, among other examples. The results listing presented in window 824 can further include an indication of whether a style guide consistency warning (e.g., 826a) or violation (e.g., 826b) was detected, together with an identification 828 of the detected style guide inconsistency and description 830 of, or other message relating to, the detected inconsistency. An identification of the offending UI attribute, as well as the path 832 to the model entity in the corresponding UI model, can be presented in the window 824. Additionally, controls 834 can be provided allowing users to designate that a detected violation in the listing should either be ignored or confirmed as an incident for later resolution. Indeed, in some examples, a user can immediately remedy an identified style guide inconsistency using the UI development tool by modifying the offending UI components, using a modification-type handler, to bring the offending components (and corresponding model entities) into compliance with the violated UI style guide rule.

FIG. 8C illustrates a screenshot 800c of a presentation forecasted violations of a set of proposed UI style guide rules (detected, for example, using a corresponding report-type handler). A listing 840 is shown, generated in response to one or more user requests to generate reports forecasting the effects of adopting a plurality of proposed UI style guide rules, including new and modified style guide rules. Each row (e.g., 848, 852) in the listing 840 can correspond to a distinct proposed UI style guide rule. Information can be presented, relating to each proposed UI style guide rule, such as a message 842 identifying or describing the proposed UI style guide rule, an application, category, or "area" 844 of the UIs found that would violate the proposed rule, and a count 846 of the number of potential violations detected by checking the UI models for violations of the proposed style guide rules. For instance, a row 848 in listing 840 can relate to a UI style guide rule specifying the correct placement of a "Send" button within a UI for which ten potential violations were identified (i.e. in column 846) within a set of UIs.

Additional details can also be made available to users surveying the results of the forecasted effect of adopting proposed UI style guide rules. For instance, an expansion control (e.g., 850) can be used to expand a row and display additional information relating to a particular analysis of a proposed UI style guide rule. For instance, the expansion control 650 of row 852 has been selected in the screenshot 800c displaying additional details to a user relating to the proposed rule of row 652. For instance, a listing of a plurality of UI categories (e.g., 854) can be presented that would be affected by a proposed UI style guide rule relating to making inclusion of a "Save/Close" button mandatory. The expanded details can further include presentation of the number of potential violations detected in each UI category. For example, a sub-row 854 corresponding to a "FIN" UI category can indicate that eighteen separate violations of the "Save/Close" button rule were identified in UIs of category "FIN." A UI category can, in some instances, correspond to a particular software application. Depending on the needs of the user, a user can further expand the presentation of forecast information by selecting expansion control 856, for instance, to expand forecast statistics relating to a UI category, such as to display identifications of individual UIs or UI elements that were forecasted to violate the proposed UI style guide rule of row 852 within category "FIN." Similar details can be identified for each of the UI style guide rows and UI categories.

While screenshot 800c of FIG. 8C, illustrated a presentation of generated reporting data based on hypothetical rule, similar reports can be generated based on models' consistency with actual, implemented rules. In some instances, reports can be based on result data, previously generated in connection with the completion of particular check operations. In other examples, a reporting operation can perform check operations to generate the data needed for the report, a corresponding reporting-type handler sharing functionality modules utilized by check-type handlers to perform similar check operations. A number of different reports, can be generated based on consistency-check data, either previously obtained or generated in connection with the performance of a reporting request. For instance, reports can provide model consistency statistics at the model level, model entity level, and model category level. A model category can include a grouping of models associated with a particular software application level, allowing reporting at the application level as well. Rule compliance trends can also be calculated and reported. For instance, common rule violations can be identified for logical groupings of models. For instance, models corresponding to a set of software components developed by a particular vendor or associated with a particular software application can be analyzed to see if recurring violations of one or more rules exist across the set of components. Further, rule-based statistics can be calculated, for instance, to identify the rate of compliance with each rule in a set of consistency rules considered during check operations. Rules, models, applications, and modeled software components can be ranked or graded based on compliance statistics. For instance, a most-violated set of rules can be identified. This can be useful, for instance, in identifying rules that may be poorly defined, impractical, or outdated, as such rules would be more prone to violation. Alternatively, reports showing rules with poor compliance can serve as the basis of training initiatives designed to better educate software component designers with regard to the oft-violated rule. Further, a low compliance rate can also suggest potential errors in handlers and modules performing checks based on the rule.

It should be appreciated that the screenshot 800c of FIG. 8C, as well as the screenshots 800a, 800b of FIGS. 8A-8B, are presented as illustrative examples only, and numerous additional and alternative interface configurations and functionality can be implemented to assist users in realizing the features described above, as well as others implied or inferred from the present disclosure.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

What is claimed is:

1. A computer-implemented method comprising:
   receiving a request to perform a particular operation of a particular type on each of a plurality of model entities included in at least one digital meta model, each model entity modeling at least one attribute of a respective software component, wherein the request includes an identification of the particular type of operation and a configuration for the particular type of operation, the particular type one of a plurality of operation types and the configuration including metadata for use in identifying handler objects needed to perform the particular type of operation;

retrieving the plurality of model entities from at least one memory device in response to the request;

instantiating, using at least one processing device, a handler object of the particular type adapted to perform the particular operation by calling a set of reusable software modules from a plurality of reusable software modules stored in at least one memory device, each software module providing functionality used to perform at least a portion of the particular operation on at least one entity in the plurality of entities; and generating result data, using at least one processing device, based on the performance of the particular operation using the instantiated handler object and the set of reusable software modules.

2. The method of claim 1, wherein the plurality of operation types is a set comprising check type operations, reporting type operations, and modification type operations.

3. The method of claim 2, wherein the handler object is instantiated from a particular object class, wherein any one of a check handler object adapted for use in performing check type operations, a reporting handler object adapted for use in performing report type operations, and a modification handler object adapted for use in performing modification type operations can be instantiated from the particular object class.

4. The method of claim 2, wherein the particular type is the check type operation, and performance of the particular operation includes parsing each entity in the plurality of entities to determine whether the entity satisfies a particular rule in a plurality of rules.

5. The method of claim 4, wherein the check type handler object is one of a plurality of check type handlers and corresponds to the particular rule, each check type handler object in the plurality of check type handlers corresponding to at least one rule in the plurality of rules.

6. The method of claim 2, wherein the particular type is the modification type operation, and performance of the particular operation includes modifying each entity in the plurality of entities to bring each entity in the plurality of entities into conformance with a particular rule in a plurality of rules.

7. The method of claim 6, wherein modification of an entity modifies the respective software component modeled, at least in part, by the entity.

8. The method of claim 2, wherein the particular type is the reporting type operation and performance of the particular operation includes parsing each entity in the plurality of entities to generate a report relating to compliance of the plurality of entities with at least one particular rule in a plurality of rules.

9. The method of claim 1, wherein the request to perform a particular operation of a particular type is a first request to perform a first operation of a first type on a first plurality of entities and the set of reusable software module is a first set of reusable modules, the method comprising:

receiving a second request to perform a second operation of a second type on each of a second plurality of entities;

retrieving the second plurality of entities in response to the second request;

instantiating a second handler object of a second type in the plurality of operation types, the second handler object adapted to perform the second operation of the second type by calling a second set of reusable software modules providing functionality to perform at least a portion of the second operation on the second plurality of entities; and receiving second result data based on the performance of the second operation using the second handler object and the second set of reusable software modules.

10. The method of claim 9, wherein the first operation type is different from the second operation type and the first set of reusable software modules includes at least one software module included in the second set of reusable software modules.

11. The method of claim 10, wherein the first operation type and second operation type are each from a set of available operation types comprising check type operations, reporting type operations, and modification type operations.

12. The method of claim 9, wherein at least one software entity in the first plurality of entities is included in the second plurality of entities.

13. The method of claim 1, wherein the plurality of model entities are included in a plurality of meta models, and retrieving the plurality of entities includes:

retrieving each of the plurality of meta models from at least one memory device; and parsing each of the plurality of meta models to identify and retrieve those model entities, in the plurality of model entities, included in the respective meta model.

14. The method of claim 1, wherein the meta model is at least one of a UI model or business object.

15. The method of claim 1, wherein the particular operation is performed on the plurality of entities as a batch.

16. The method of claim 1, wherein the meta model is a digital, parsable XML file.

17. The method of claim 1, wherein the handler object includes scope data used to identify the plurality of entities.

18. The method of claim 17, wherein the scope data identifies a plurality of meta models to which the particular operation applies, each meta model in the plurality of meta models including at least one of the plurality of entities.

19. The method of claim 17, further comprising dynamically selecting the plurality of entities from a set of entities including at least the plurality of entities, based at least in part on the scope data of the handler object.

20. An article comprising a non-transitory, machine-readable storage device storing instructions operable to cause at least one processor to perform operations comprising:

receiving a request to perform a particular operation of a particular type on each of a plurality of model entities included in at least one digital meta model, each model entity modeling at least one attribute of a respective software component, wherein the request includes an identification of the particular type of operation and a configuration for the particular type of operation, the particular type is one of a plurality of operation types and the configuration including metadata for use in identifying handler objects needed to perform the particular type of operation;

retrieving the plurality of model entities from at least one memory device in response to the request;

instantiating a handler object of the particular type adapted to perform the particular operation by calling a set of reusable software modules from a plurality of reusable software modules stored in at least one memory device, each software module providing functionality used to perform at least a portion of the particular operation on at least one entity in the plurality of entities; and generating result data based on the performance of the particular operation using the instantiated handler object and the set of reusable software modules.

21. A system comprising:

at least one hardware processor interoperably coupled to a memory and configured to:

access:

a digital library of digital meta models, the library of digital meta models including a plurality of meta models, each meta model in the plurality of meta models including a respective plurality of model entities, each model entity modeling at least one attribute of a software component in a plurality of software components;

a digital library of reusable functionality modules; and a digital library of handler objects, the digital library of handler objects including a plurality of handler objects, each handler object adapted to perform a corresponding operation of a type included in a set of operation types including check type operations, reporting type operations, and modification type operations by calling functionality modules from the plurality of reusable functionality modules; and use at least one execution engine executing on the hardware processor and configured to:

retrieve a set of model entities included in the plurality of meta models in response to a request for a particular operation of a particular type to perform on each model entity of the set of model entities, the request identifying the particular operation and a configuration for the particular operation, the particular operation a type of operation from the set of operation types and the configuration including metadata for use in identifying handler objects needed to perform the particular operation;

call a particular handler object from the plurality of handler objects to perform the particular operation on the set of model entities, wherein the particular handler object performs the operation by calling at least two software modules from the plurality of reusable functionality modules, each of the at least two software modules performing at least a portion of the particular operation on at least one model entity in the set of entities; and collect result data from the performance of the particular operation.

22. A computer-implemented method comprising:

receiving a first request to generate a first handler object for inclusion in a plurality of handler objects and adapted for use in performing a first operation of a first operation type on a first plurality of model entities modeling attributes of at least one software component and included in at least one digital meta model, the first request including an identification of at least two functionality modules and a configuration for the first handler object, the at least two functionality modules comprising a first set of modules, from a plurality of reusable functionality modules, each functionality module in the at least two functionality modules adapted to perform at least a portion of the first operation on at least one of the first plurality of model entities and the configuration including metadata for use in identifying handler objects needed to perform the first operation; and instantiating, by a computer, the first handler object from an object class adapted to serve as the basis of instantiating handler objects adapted to perform operations of the first operation type and handler objects adapted to perform operations of a second operation type, wherein the first operation type is different from the second operation type and the first handler object is adapted to call each functionality module in the first set of modules in connection with the performance of the first operation.

23. The method of claim 22, wherein the first operation type and second operation type are each from a set of available operation types comprising check type operations, reporting type operations, and modification type operations.

24. The method of claim 22, wherein the request further includes an identification of the first operation type.

25. The method of claim 22, further comprising:

receiving a second request to generate a second handler object for inclusion in the plurality of handler objects and adapted for use in performing a second operation, of the second operation type, on a second plurality of model entities, the second request including an identification of at least two functionality modules, comprising a second set of modules, from the plurality of reusable functionality modules, each functionality module in the second set of modules adapted to perform at least a portion of the second operation on at least one of the second plurality of model entities; and instantiating the second handler object from the object class, the second handler object adapted to call each of the second set of modules in connection with the performance of the second operation.

26. The method of claim 25, wherein at least one functionality module in the first set of modules is included in the second set of modules.

* * * * *